(12) United States Patent
Kaneiwa

(10) Patent No.: US 8,474,729 B2
(45) Date of Patent: Jul. 2, 2013

(54) FORCED DRAFT DIRECT VENT TYPE ROOM HEATER

(75) Inventor: Satoshi Kaneiwa, Nagoya (JP)

(73) Assignee: Rinnai Corporation, Nagoya-Shi (JP)

( * ) Notice: Subject to any disclaimer, the term of this patent is extended or adjusted under 35 U.S.C. 154(b) by 920 days.

(21) Appl. No.: 12/577,328

(22) Filed: Oct. 12, 2009

(65) Prior Publication Data

US 2010/0025487 A1    Feb. 4, 2010

(51) Int. Cl.
*F24D 19/00* (2006.01)
*F24D 9/00* (2006.01)

(52) U.S. Cl.
USPC ............. 237/2 A; 237/53; 236/49.3; 126/504; 700/276; 700/278

(58) Field of Classification Search
USPC ..... 237/53, 2 A; 126/504; 236/49.3; 700/276, 700/278
IPC ...................................................... F24D 19/10
See application file for complete search history.

(56) References Cited

U.S. PATENT DOCUMENTS

| | | | | |
|---|---|---|---|---|
| 1,782,711 A | * | 11/1930 | Callahan | 237/49 |
| 2,789,554 A | * | 4/1957 | Dupler | 237/55 |
| 4,143,817 A | * | 3/1979 | Oliver | 237/55 |
| 4,262,843 A | * | 4/1981 | Omori et al. | 236/20 R |
| 4,266,526 A | * | 5/1981 | Tolotti | 126/502 |
| 4,299,554 A | * | 11/1981 | Williams | 431/16 |
| 4,438,756 A | * | 3/1984 | Chamberlain et al. | 126/522 |
| 4,477,019 A | * | 10/1984 | Breitbach | 237/55 |
| 4,478,206 A | * | 10/1984 | Ahn | 126/99 A |
| 4,515,145 A | * | 5/1985 | Tallman et al. | 126/99 A |
| 5,218,953 A | * | 6/1993 | Shimek et al. | 126/512 |
| 5,406,933 A | * | 4/1995 | Lu | 126/110 R |
| 5,647,341 A | * | 7/1997 | Langman et al. | 126/512 |
| 7,451,759 B2 | * | 11/2008 | Weiss et al. | 126/286 |
| 7,992,794 B2 | * | 8/2011 | Leen et al. | 700/276 |
| 2005/0247304 A1 | * | 11/2005 | Weiss | 126/504 |
| 2006/0137678 A1 | * | 6/2006 | Tsunekawa et al. | 126/521 |
| 2009/0194603 A1 | * | 8/2009 | Gibbon et al. | 237/48 |
| 2009/0223466 A1 | * | 9/2009 | Knorr, Jr. | 122/448.1 |

FOREIGN PATENT DOCUMENTS

| | | | |
|---|---|---|---|
| JP | 49126150 | * | 12/1974 |
| JP | 55-094647 | | 7/1980 |
| JP | 07318180 A | * | 12/1995 |

* cited by examiner

*Primary Examiner* — Steven B McAllister
*Assistant Examiner* — Phillip E Decker
(74) *Attorney, Agent, or Firm* — Rankin, Hill & Clark LLP

(57) ABSTRACT

The room heater has, in an outer case 1, both a first air flow passage that leads to a vent hole 12 through a section in which the main heat exchanger 6 is arranged and a second air flow passage that does not pass through the section in which the main heat exchanger 6 is arranged but leads to the vent hole 12 through a section in which a supplementary heat exchanger 6' is arranged provided. At least one of the first damper 20 which can freely block the first air flow passage and the second damper 21 which can freely block the second air flow passage is provided, and the first air flow passage or the second air flow passage is blocked in a weak combustion period.

6 Claims, 5 Drawing Sheets

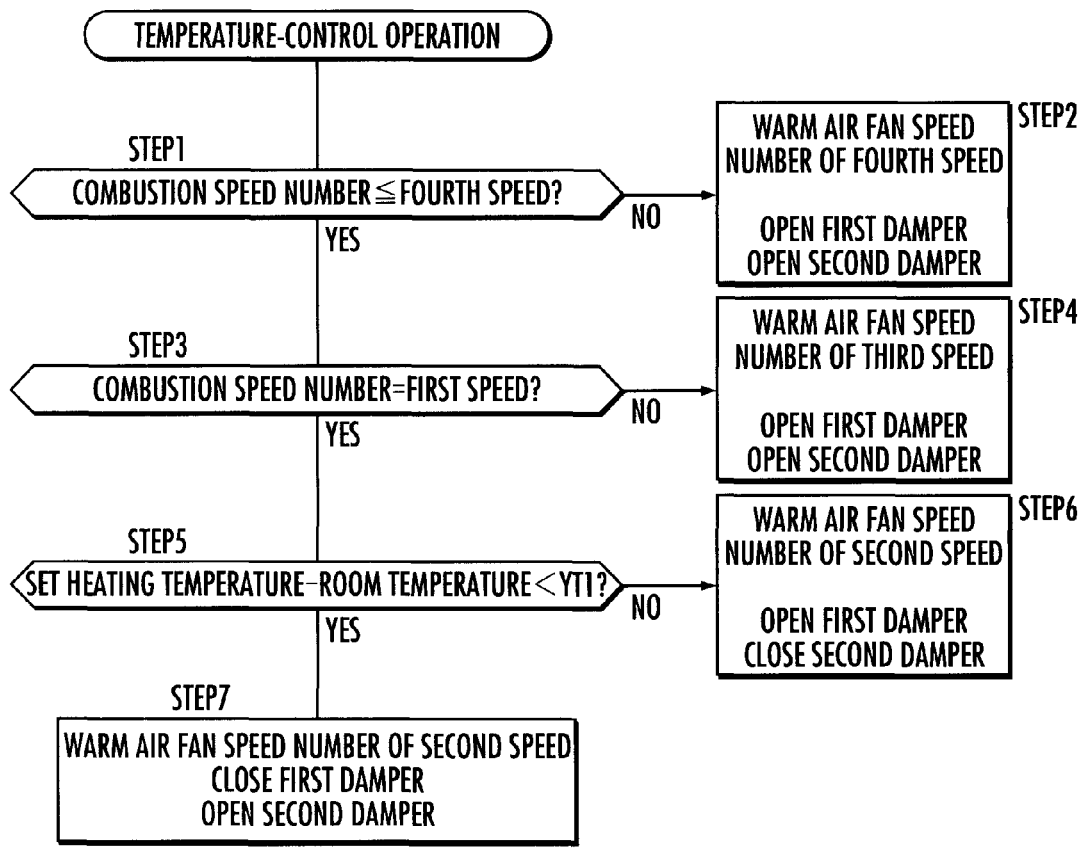
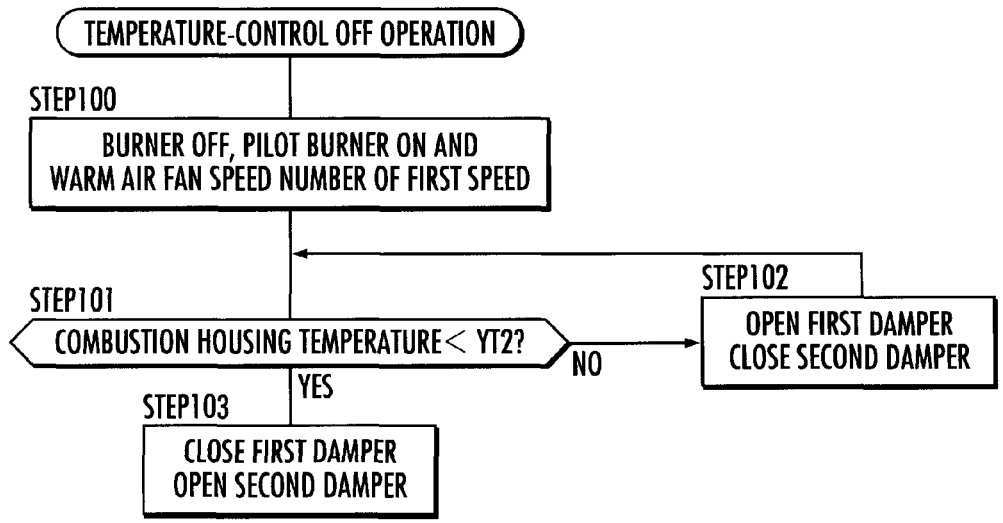

FORCED DRAFT DIRECT VENT TYPE ROOM HEATER

BACKGROUND OF THE INVENTION

1. Field of the Invention

The present invention relates to a forced draft direct vent type room heater which forcibly supplies air for combustion and exhausts a combusted gas.

2. Description of the Related Art

Conventionally, such a room heater is known as is described in Japanese Utility Model Laid-Open No. 55-94647. This room heater has a burner housed in a combustion housing provided in an outer case. In the combustion housing, air for combustion is supplied and a combusted gas is exhausted by a combustion fan. In an exhaust path for exhausting the combusted gas therethrough, a main heat exchanger is provided in the upper stream side, and a supplementary heat exchanger is provided in the down stream side. In the outer case, an air intake and a vent hole are provided. In the outer case, a warm air fan is provided, and this warm air fan takes in room air from the air intake and sends the air to the inside of the room from the vent hole through the main heat exchanger and the supplementary heat exchanger.

In the above described official bulletin, the supplementary heat exchanger is arranged in the back side of the main heat exchanger. The room air flows to the vent hole through an air flow passage in the back side and an air flow passage in the front side of the main heat exchanger. Thereby, the room air flowing in the air flow passage in the back side is heated by the main heat exchanger and the supplementary heat exchanger.

In addition, a damper which can freely block the flow of the room air is provided in the air flow passage in the back side in the inner part of the outer case. The damper passes the room air to both of the air flow passages in the front side and the back side, when the length of an exhaust extension tube connected to the downstream end of the exhaust path is short. When the length of the exhaust extension tube is long, the damper blocks the flow of the room air flowing into the air flow passage in the back side. This aims at lowering the heat exchange efficiency of the room heater itself and raising the temperature of the combusted gas flowing into the exhaust extension tube, because when the exhaust extension tube provided in the room is long, a heat released from the exhaust extension tube also contributes to heating of the inside of the room.

By the way, a room heater also is recently required to provide higher efficiency as a measure against global warming. Here, in the above described conventional example, even when the length of the exhaust extension tube is long, the heat exchange efficiency is improved better by a method of passing room air to both of the air flow passages in the front side and in the back side. Accordingly, regardless of the length of the exhaust extension tube, it is advantageous for increasing the efficiency to pass the room air through both of the air flow passages in the front side and in the back side.

However, in the above described conventional example, the room air flowing into the air flow passage in the back side of the main heat exchanger results in being heated by the supplementary heat exchanger in a state of having been heated by the main heat exchanger. For this reason, the heat exchange efficiency of the supplementary heat exchanger is not enhanced so much.

In addition, there is occasionally employed a structure of providing a drain dish for making a drain formed in the exhaust extension tube flow into itself in the outer case, and passing the room air (warm air) which is heated by the heat exchanger to a section in which the drain dish is arranged to evaporate the drain in the drain dish. In this case, it causes the following problem when the heat exchange efficiency is enhanced. That is, in a weak combustion period, the temperature of the combusted gas flowing in the exhaust extension tube is excessively lowered, so that an amount of the formed drain exceeds an amount of an evaporated drain, and the drain overflows from the drain dish. In order to prevent the overflow of the drain from the drain dish, it is necessary to shorten the length of the exhaust extension tube and to reduce the amount of the formed drain. As a result, a position where the room heater can be set becomes limited.

SUMMARY OF THE INVENTION

The present invention is designed with respect to the above described points, and its object is to provide a forced draft direct vent type room heater which can enhance its heat exchange efficiency as much as possible, and can prevent the drain from overflowing from the drain dish in the weak combustion period even without shortening the length of the exhaust extension tube.

The present invention provides a forced draft direct vent type room heater comprising: an outer case, a combustion housing which is provided in the outer case and houses a burner therein, a combustion fan for forced draft direct ventilation, which is provided on the way of any one of an air supply path that supplies air for combustion to the combustion housing and an exhaust path that exhausts a combusted gas from the combustion housing, a main heat exchanger in an upstream side and a supplementary heat exchanger in a downstream side, which are provided in the outer case and are provided on the way of the exhaust path, an air intake and a vent hole which are opened in the outer case, a warm air fan in the outer case for taking in room air from the air intake and sending the air to the inside of the room from the vent hole through a section in which the main heat exchanger and the supplementary heat exchanger are arranged, and a drain dish which is provided in the outer case and makes a drain formed in an exhaust extension tube that is connected to a downstream end of the exhaust path to flow into the drain dish itself, wherein a first air flow passage that leads to the vent hole in the outer case through a section in which the main heat exchanger is arranged and a second air flow passage that does not pass through the section in which the main heat exchanger is arranged but is led to the vent hole through a section in which the supplementary heat exchanger is arranged are separately formed in the outer case, at least one of a first damper which can freely block the flow of the room air flowing into the first air flow passage due to the warm air fan and a second damper which can freely block the flow of the room air flowing into the second air flow passage due to the warm air fan is provided, and the flow of the room air flowing into the first air flow passage or the second air flow passage is blocked, in a weak combustion period in which a combustion amount of the burner is a predetermined amount or less.

According to the present invention, the room air passed into the first air flow passage is heated by the main heat exchanger, and the room air passed into the second air flow passage is also heated by the supplementary heat exchanger. Here, the room air passed into the second air flow passage flows to a section in which the supplementary heat exchanger is arranged, in a state of being kept at a low temperature without being heated by the main heat exchanger, and is efficiently heated by the supplementary heat exchanger. Accordingly, the heat exchange efficiency of the whole room heater is enhanced as much as possible.

In a weak combustion period, the flow of the room air flowing into the first air flow passage or the second air flow passage is blocked, so that the heat exchange efficiency is prevented from lowering, and the temperature of the combusted gas flowing in the exhaust extension tube is prevented from being excessively lowered. Accordingly, it is possible to effectively prevent the amount of a formed drain from exceeding an amount of an evaporated drain and the drain overflowing from the drain dish in the weak combustion period, even without shortening the length of the exhaust extension tube.

In addition, in a forced draft direct vent type room heater according to the present invention, it is preferable that both of the first damper and the second damper are provided therein, the first air flow passage is formed along the outer surface of the combustion housing, and when the temperature of the combustion housing is a predetermined temperature or higher in the temperature-control OFF operation period, the room air is passed into the first air flow passage and the flow of the room air flowing into the second air flow passage is blocked, and when the temperature of the combustion housing is lower than the predetermined temperature, the room air is passed into the second air flow passage and the flow of the room air flowing into the first air flow passage is blocked.

Thereby, when the deviation of a room temperature from a set heating temperature is a predetermined value or more, the room air is heated only by the main heat exchanger, so that the temperature of the combusted gas flowing in the exhaust extension tube can be prevented from being excessively lowered while a heating amount necessary for promptly raising the room temperature to the set heating temperature is maintained. In addition, when the deviation of the room temperature from the set heating temperature is less than the predetermined value, the room air is heated only by the supplementary heat exchanger, so that the heating amount decreases, and the room temperature is inhibited from overshooting to a temperature over the set heating temperature, which enhances the temperature control performance.

By the way, when a heating load is light, the room temperature may continue rising even if the burner is burned at a lower limit combustion amount. Then, when the room temperature exceeds a predetermined upper limit temperature which is set higher than the set heating temperature, the temperature-control OFF operation is conducted which rotates the warm air fan at a low speed in a state in which the burner stops combustion. The warm air fan is not stopped in the temperature-control OFF operation period in order to keep a difference between upper and lower temperatures in the room as small as possible.

Here, when the temperature-control OFF operation is started, a warm air is sent from a vent hole because heat is accumulated in the room heater, but the heat in the room heater is released as time passes, so that the temperature of the air sent from the vent hole is lowered, and a cool-felt air starts to be sent. In this case, the timing at which the cool-felt air starts to be sent can be delayed by blocking the flow of the room air flowing into the first air flow passage or into the second air flow passage in the temperature-control OFF operation period, because the heat in the room heater is slowly released.

When the first air flow passage is formed along the outer surface of the combustion housing, if the temperature of the combustion housing is a predetermined temperature or higher in the temperature-control OFF operation period, it is preferable to pass the room air through the first air flow passage and block the flow of the room air flowing into the second air flow passage, and if the temperature of the combustion housing is lower than a predetermined temperature, it is preferable to pass the room air through the second air flow passage and block the flow of the room air flowing into the first air flow passage. Thereby, when the temperature of the combustion housing is the predetermined temperature or higher, the main heat exchanger and the combustion housing release the heat, and when the temperature of the combustion housing is lowered and reaches a temperature lower than the predetermined temperature due to the heat release, the supplementary heat exchanger releases the heat. Then, the timing at which the cool-felt air starts to be sent can be delayed as much as possible.

BRIEF DESCRIPTION OF THE DRAWINGS

FIG. 5 is a flow chart illustrating the control in a temperature-control operation period; and FIG. 6 is a flow chart illustrating the control in a temperature-control OFF operation period.

DETAILED DESCRIPTION OF THE PREFERRED EMBODIMENTS

Figure 1:
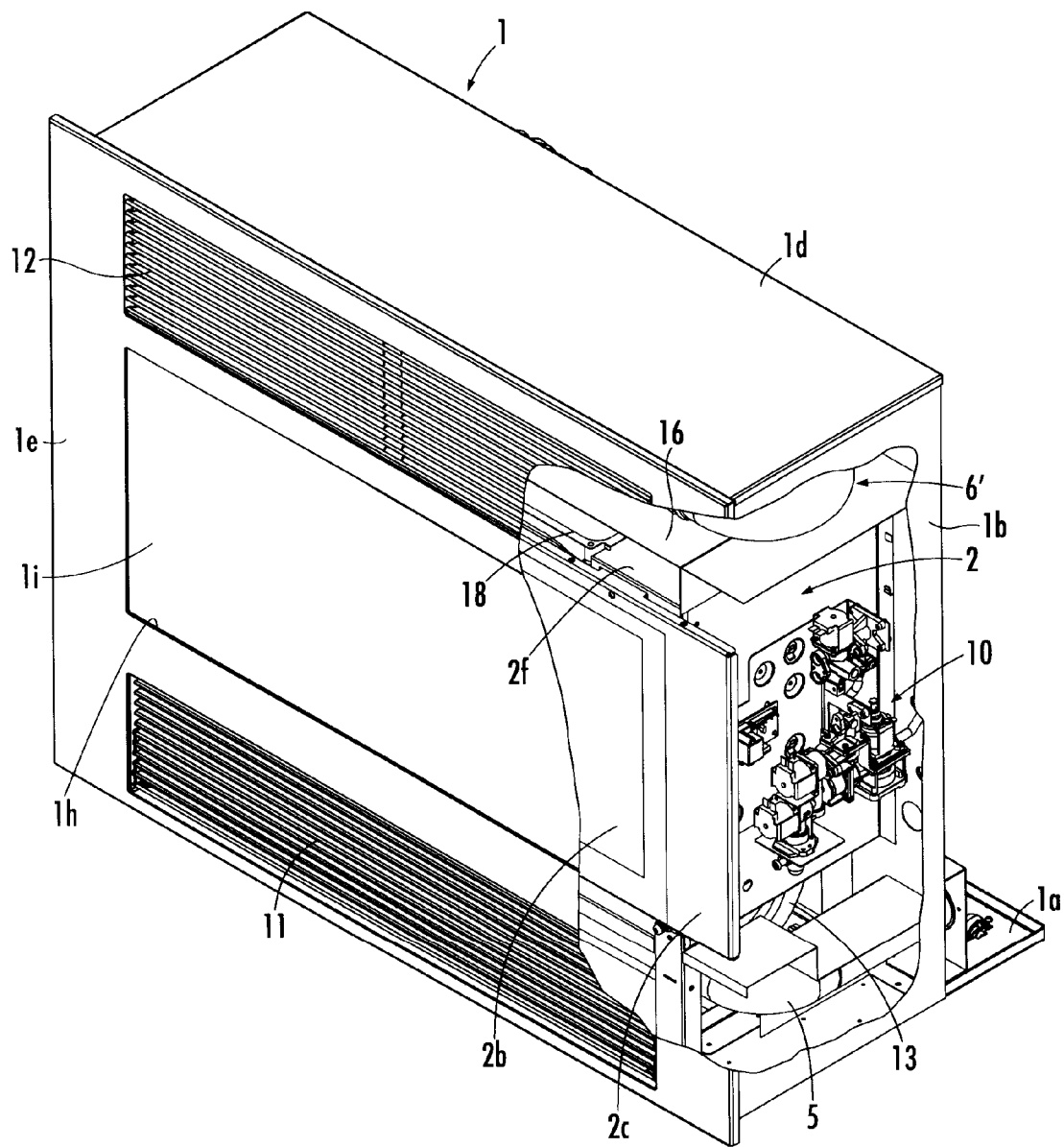
FIG. 1 is a perspective view of a room heater according to an embodiment of the present invention, which is viewed from an upper side in a diagonally front right direction.

The embodiment in which the present invention is applied to a fireplace type room heater will now be described below. This room heater comprises an outer case 1 and a combustion housing 2 which is provided in the outer case 1, as is illustrated in FIG. 1 to FIG. 4. The outer case 1 is constituted by a bottom plate 1a, right-and-left side plates 1b, a back plate 1c, an upper plate 1d, a front panel 1e, a first extension case 1f which is installed in a portion closer to one side of the back face of the back plate 1c, and a second extension case 1g which is installed from the other half side of the back face of the back plate 1c to the upper part of the first extension case 1f.

A burner 3 and a pilot burner 3a for igniting the burner 3 are arranged in the lower part of the inside of the combustion housing 2. In addition, a burner supporting plate 2a in which an opening for fitting the upper end part of the burner 3 is formed is arranged in the combustion housing 2, and a false firewood 4 which is formed from a refractory material such as ceramics is arranged on the burner supporting plate 2a. A glass plate 1b is fitted in a front face of the combustion housing 2, and a window 1h through which the glass plate 2b is overlooked is opened in the front panel 1e of the outer case 1. Thus, the inside of the combustion housing 2 can be viewed from the front of the front panel 1e, and when the burner 3 is burned, such an impression as if the false firewood 4 is really burning can be visually given.

The front panel 1e can also be formed so that the peripheral portion of the window 1h closely contacts the peripheral portion of the front face of the combustion housing 2, but incidentally in the present embodiment, the front panel 1e is arranged so that the window 1h is slightly separated from the front face of the combustion housing 2, and a window glass 1i is fitted in the window 1h. In addition, the above described glass plate 2b of the front face of the combustion housing 2 is fitted in the front door 2c which is provided on the front face of the main body of the combustion housing 2 so as to be freely opened and closed, and the burner 3 in the combustion housing 2 can be provided with maintenance in a state in which the front door 2c is opened. This front door 2c is supported by the combustion housing 2 at the lower end part tiltably in a forward and backward direction, and is pushed backward by pushing means 2e arranged on the upper wall 2d of the combustion housing 2 to closely contact the front face of the main body of the combustion housing 2. A cover 2f for covering the pushing means 2e from above is provided on the upper wall 2d of the combustion housing 2.

An air supply duct 5 which constitutes an air supply path is connected to the bottom face of the combustion housing 2. Outdoor air is supplied to the air supply duct 5 through an air supply extension tube which is not shown. The outdoor air is forcibly supplied into the combustion housing 2 through the air supply duct 5 by a suction force of a combustion fan 7 which will be described later.

In the outer case 1, a main heat exchanger 6 is arranged which is positioned in the back side of the combustion housing 2 and is provided on the way of an exhaust path for exhausting a combusted gas sent from the combustion housing 2. The main heat exchanger 6 is connected to the combustion housing 2 through a communication tube 6a. The combustion fan 7 for forced draft direct ventilation, which is arranged in the first extension case 1f, is provided on the way of the exhaust path. An exhaust duct 8 which is connected to the downstream side of the main heat exchanger 6 though the combustion fan 7 is inserted into the outer case 1 in a side space between the side plate 1b in one side in a transverse direction of the outer case 1 and the combustion housing 2.

In addition, a control substrate 9 is arranged in one side in a transverse direction of the lower part of the inside of the outer case 1, and a valve unit 10 for the burner 3 is arranged in a side space between the side plate 1b in the other side in a transverse direction of the outer case 1 and the combustion housing 2.

An air intake 11 is opened in the lower part of the front panel 1e of the outer case 1, and a vent hole 12 is opened in the upper part thereof. A warm air fan 13 that takes in room air from the air intake 11, passes the air through a section in which the main heat exchanger 6 is arranged and sends the air to the inside of the room from the vent hole 12 is arranged in the outer case 1, and thereby a warm air heating function can be obtained.

Figure 2:
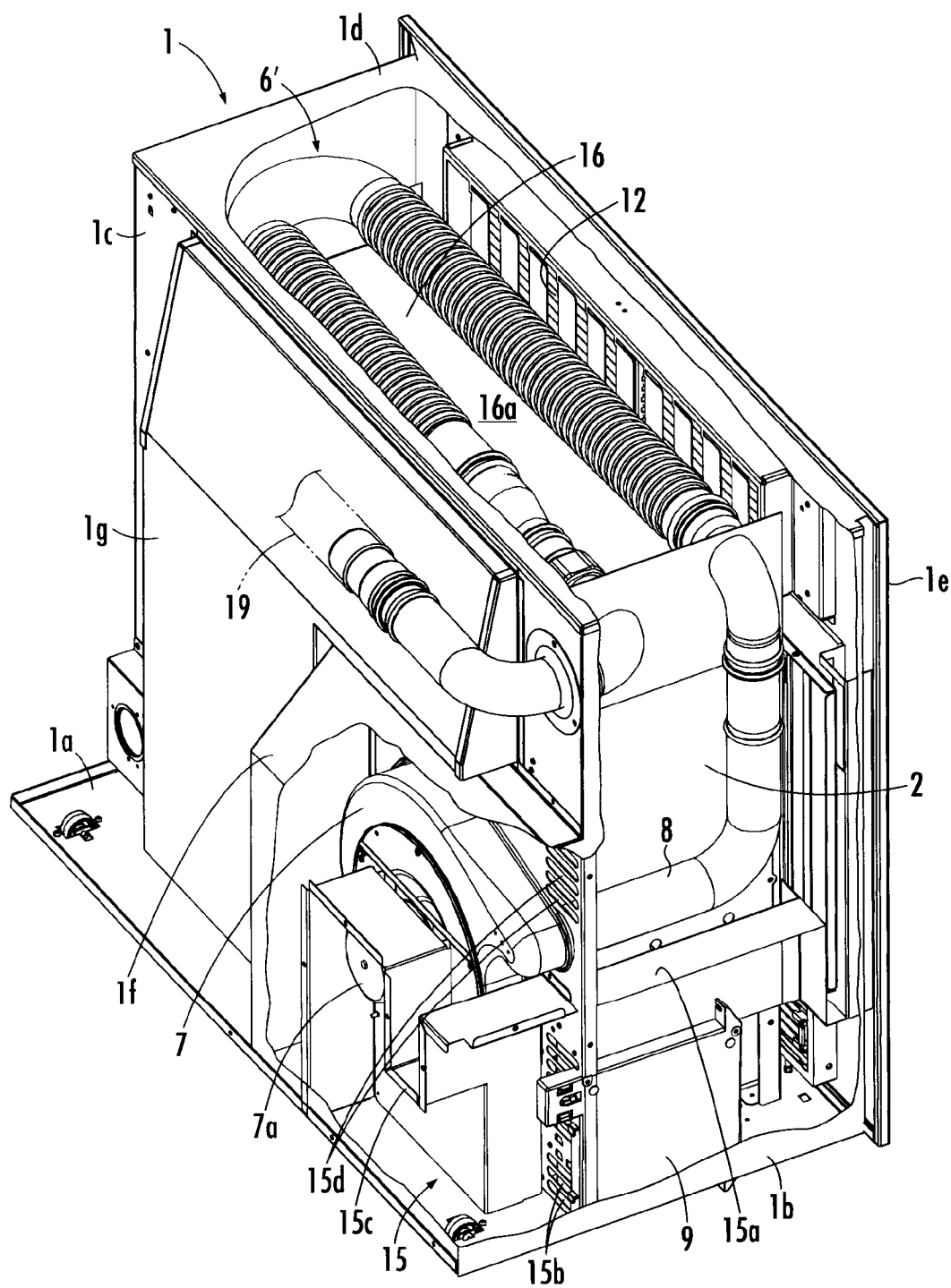
FIG. 2 is a perspective view of a room heater according to the embodiment, which is viewed from an upper side in a diagonally backside left direction.
Figure 3:
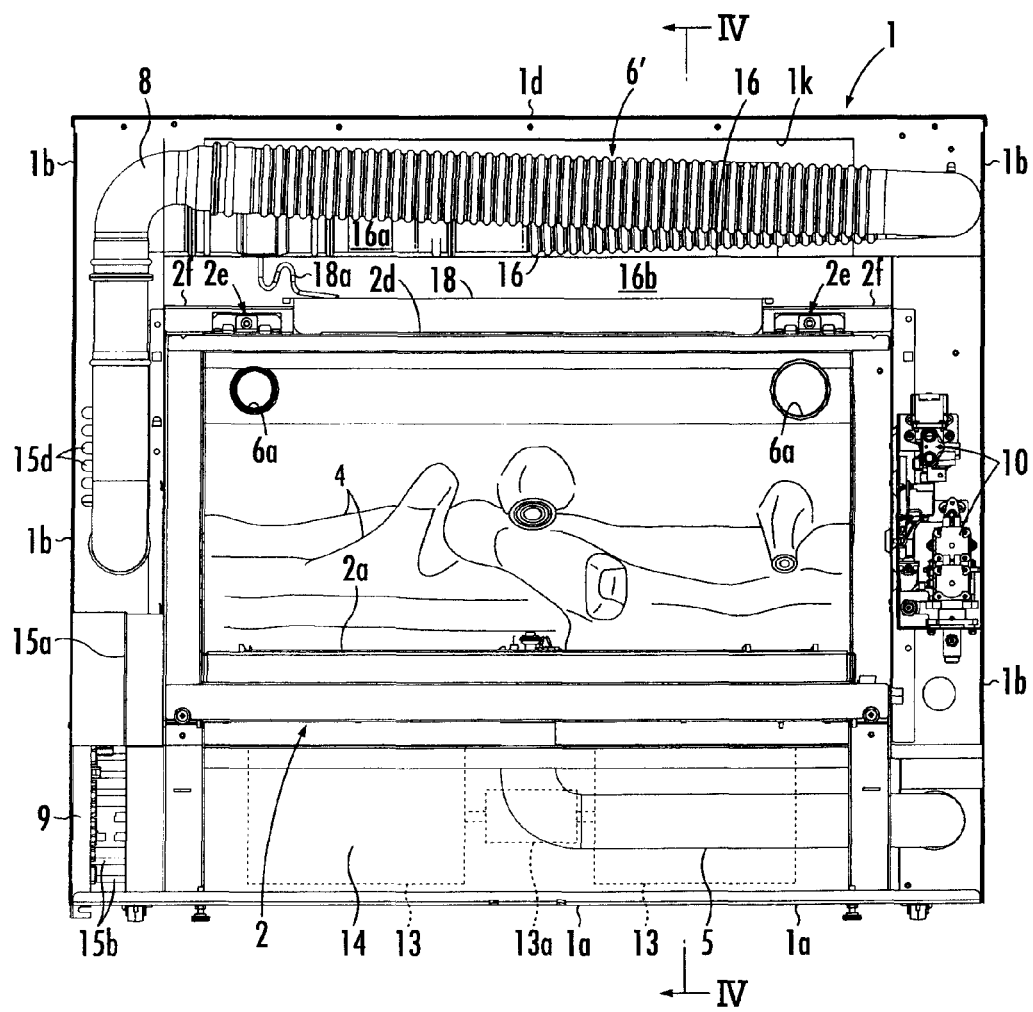
FIG. 3 is a front view illustrating a state in which a front panel and a front door of a combustion housing in the room heater according to the embodiment are removed.
Figure 4:
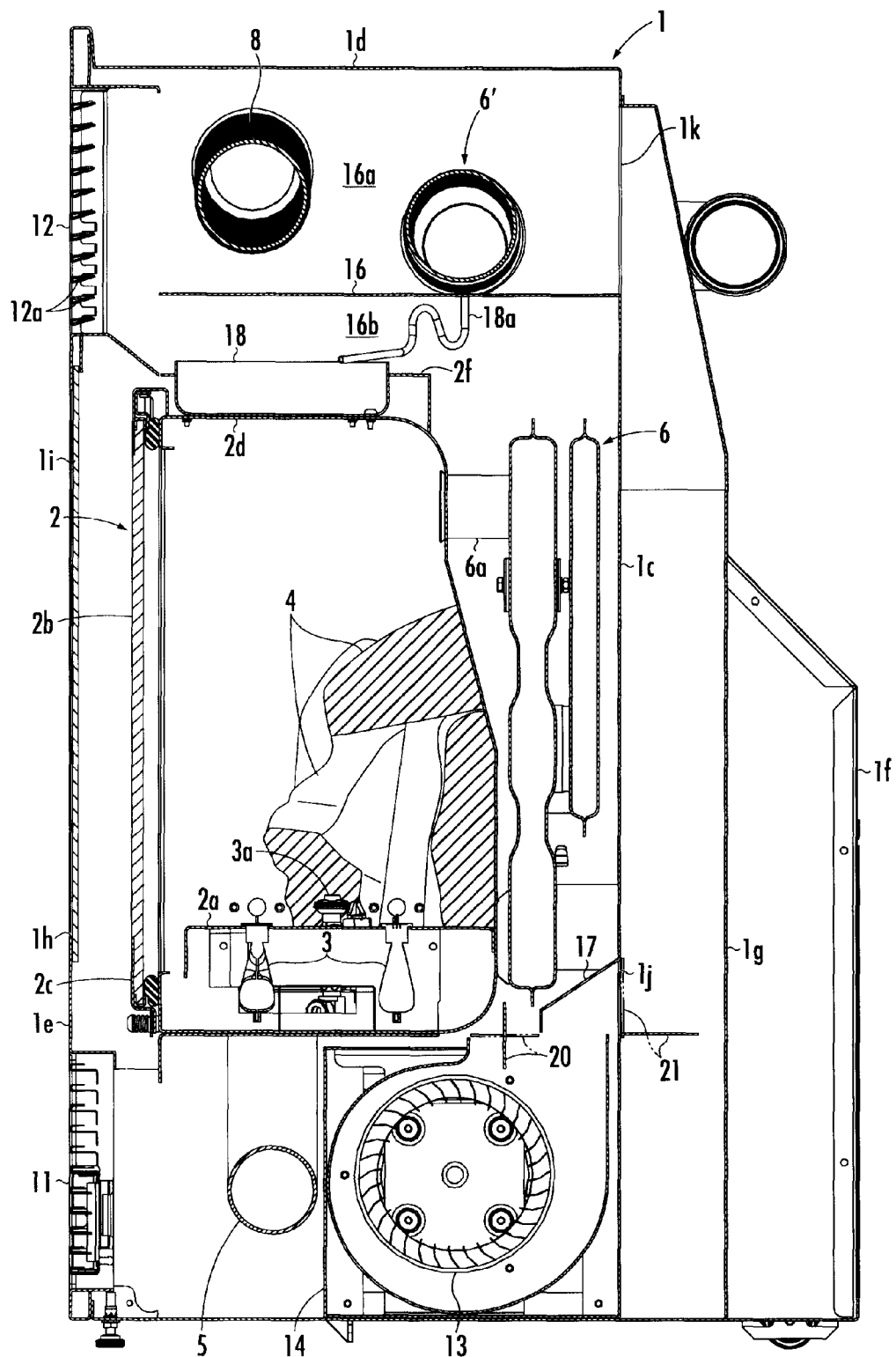
FIG. 4 is a sectional view taken along the line IV-IV of FIG. 3.

The warm air fan 13 is arranged in a horizontally long fan box 14 which is installed in the lower space of the combustion housing 2. The fan box 14 has openings in both side parts of itself in a transverse direction. As is illustrated in FIG. 2, a wind introduction path 15 is provided which leads one part of air taken in from the air intake 11 to an aperture in one side in a transverse direction of the fan box 14 through a section in which the control substrate 9 is arranged and a section in which a fan motor 7a for the combustion fan 7 is arranged. The wind introduction path 15 is constituted by: a first air guide plate 15a which surrounds the section in which the control substrate 9 is arranged from the inner side in the transverse direction to the upper side; a first air hole 15b which is formed in the back plate 1c of the outer case 1 so as to face a part surrounded by the first air guide plate 15a; a second air guide plate 15c placed in the first extension case 1f, which leads the air sent from the first air hole 15b to the section in which the fan motor 7a is arranged; and a second air hole 15d which is formed in the back plate 1c of the outer case 1 so as to be positioned above the first air guide plate 15a. Then, the air which is returned to the inside of the outer case 1 from the second air hole 15d is led to the aperture in one side in a transverse direction of the fan box 14 through a gap between the first air guide plate 15a and the side wall in one side in a transverse direction of the combustion housing 2.

A pair of the warm air fans 13 are provided with a space therebetween in a transverse direction. A common fan motor 13a which drives both of the warm air fans 13 and 13 is arranged between both of the warm air fans 13 and 13.

The room air which is blown from the warm air fan 13 is led to the vent hole 12 through the section in which the main heat exchanger 6 is arranged, and a space between the upper plate 1d of the outer case 1 and the upper wall 2d of the combustion housing 2. Then, the room air is heated by the main heat exchanger 6 due to the heat exchange with the combusted gas, is heated to be a warm air, and is sent to the inside of the room from the vent hole 12. A louver 12a which is tilted obliquely downward is attached to the vent hole 12. Therefore, the warm air does not hit a face of a user who is warming oneself while sitting on a sofa or the like in front of a room heater.

Here, the space between the upper plate 1d of the outer case 1 and the upper wall 2d of the combustion housing 2 is partitioned into two rooms of an upper room 16a and a lower room 16b by a partitioning plate 16. The room air having passed through the section in which the main heat exchanger 6 is arranged is led to the vent hole 12 through the lower room 16b. That is, a first air flow passage according to the present invention is constituted by a space between the back face of the combustion housing 2 having the main heat exchanger 6 arranged therein and the back plate 1c, and the lower room 16b. The first air flow passage results in being formed along the outer surface of the combustion housing 2.

In the upper room 16a, a supplementary heat exchanger 6' is provided on the way of the exhaust path so as to be positioned in a downstream side of the main heat exchanger 6. The supplementary heat exchanger 6' is structured so as to meander in a U-shape the exhaust duct 8 in a transverse direction. The back plate 1c of the outer (case 1 has a lower aperture 1j which makes one part of the room air blown from the warm air fan 13 flow into a second extension case 1g through a flow-dividing plate 17, and an upper aperture 1k which communicates a space in the second extension case 1g to the upper room 16a. Thus, one part of the room air blown from the warm air fan 13 does not pass through the section in which the main heat exchanger 6 is arranged but is led to the vent hole 12 through the inside of the second extension case 1g and the upper room 16a. That is, the second air flow passage according to the present invention is constituted by the second extension case 1g and the upper room 16a having the supplementary heat exchanger 6' arranged therein.

In addition, a drain dish 18 is arranged on the upper face of the upper wall 2d of the combustion housing 2. A drain pipe 18a which leads to the drain dish 18 is branched from and connected to a part of the exhaust duct 8 which is the bottom-most part of the supplementary heat exchanger 6'. An exhaust extension tube 19 (see FIG. 2) for exhausting the combusted gas to the outdoors is connected to the downstream end (downstream end of exhaust path) of the exhaust duct 8. A drain formed in the exhaust extension tube 19 flows down to the exhaust duct 8, and flows into the drain dish 18 through the drain pipe 18a.

In the present embodiment, a first damper 20 is provided so as to be positioned in a gap between a lower end of the back face of the combustion housing 2 and the flow-dividing plate 17 and can freely block the flow of the room air flowing into the first air flow passage by the warm air fan 13, and a second damper 21 is also provided so as to be positioned in the lower aperture 1j of the back plate 1c and can freely block the flow of the room air flowing into the second air flow passage by the warm air fan 13.

Next, the control in a period of a temperature-control operation which varies a combustion speed number (number that shows combustion amount of burner 3) according to the deviation of the room temperature from the set heating temperature will now be described with reference to FIG. 5. In the description, the combustion speed number can be freely varied in a range between the seventh speed which is the upper limit and the first speed which is the lower limit, and a warm air fan speed number (number that shows rotation speed of warm air fan 13) can be freely varied in a range between the fourth speed which is the highest speed and the first speed which is the lowest speed. In addition, the rotation speed of the combustion fan 7 can be varied according to the combustion speed number.

When the deviation of the room temperature from the set heating temperature is large and the combustion speed number becomes the fifth speed or more (STEP 1), the room heater sets the warm air fan speed number at the fourth speed, opens both of the first and second dampers 20 and 21, and passes the room air into both of the first and second air flow passages (STEP 2). Thereby, the room air passed into the first air flow passage is heated by the main heat exchanger 6, and the room air passed into the second air flow passage is heated by the supplementary heat exchanger 6'. Here, the room air passed into the second air flow passage flows to a section in which the supplementary heat exchanger 6' is arranged, in a state of being kept at a low temperature without being heated by the main heat exchanger 6, and is efficiently heated by the supplementary heat exchanger 6'. Accordingly, the heat exchange efficiency of the whole room heater is enhanced as much as possible. In addition, when the combustion speed number is the second speed or more but the fourth speed or less (STEP 3), the room heater sets the warm air fan speed number at the third speed in a state of having opened both of the first and second dampers 20 and 21 (STEP 4).

When the combustion speed number becomes the first speed, the room heater judges whether the deviation of the room temperature detected by a temperature sensor (not shown) arranged in the vicinity of an air intake 11 from the set heating temperature is less than a predetermined value YT1 or not (STEP 5). As a result, when the deviation is YT1 or more, the room heater sets the warm air fan speed number at the second speed, closes the second damper 21 as is illustrated by an imaginary line in FIG. 4, in a state of keeping the first damper 20 opened, and blocks the flow of the room air flowing into the second air flow passage (STEP 6). On the other hand, when the deviation is less than YT1, the room heater opens the second damper 21 in a state of keeping the warm air fan speed number at the second speed to pass the room air into the second air flow passage, and also closes the first damper 20 as is illustrated by an imaginary line in FIG. 4 to block the flow of the room air flowing into the first air flow passage (STEP 7).

At this time, when the room air is passed into both of the first and second air flow passages in a state in which the combustion speed number becomes the first speed, the temperature of the combusted gas flowing in the exhaust extension tube 19 is excessively lowered, and the amount of formed drain increases. Then, in order to prevent the drain from overflowing from the drain dish 18, there is no other choice but to shorten the length of the exhaust extension tube 19. In contrast to this, in the present embodiment, when the combustion speed number becomes the first speed, if the deviation of the room temperature from the set heating temperature is YT1 or more, the flow of the room air flowing into the second air flow passage is blocked as is described above, and the room air is heated only by the main heat exchanger 6. Accordingly, the temperature of the combusted gas flowing in the exhaust extension tube 19 can be prevented from being excessively lowered while a heating amount necessary for promptly raising the room temperature to the set heating temperature is maintained. As a result, even if the exhaust extension tube 19 is comparatively long, the drain from the drain dish 18 can be prevented from overflowing. In addition, when the deviation of the room temperature from the set heating temperature is less than YT1, the room air is heated only by the supplementary heat exchanger 6', and the heating amount decreases. Therefore, the room temperature is inhibited from overshooting to a temperature over the set heating temperature, which enhances the temperature control performance.

By the way, when a heating load is light, the room temperature occasionally continues rising even though the combustion speed number is set at the first speed. Then, when the room temperature exceeds a predetermined upper limit temperature which is set higher than a set heating temperature (set heating temperature +3° C., for instance) the temperature-control OFF operation is conducted. In the temperature-control OFF operation, as is illustrated in FIG. 6, only a pilot burner 3a is burnt, the combustion in the burner 3 is stopped, and the warm air fan speed number is set at the first speed (STEP 100).

Here, when the temperature-control OFF operation is started, a warm air is sent from the vent hole 12 because heat is accumulated in the room heater, but the heat in the room heater is released as time passes, the temperature of air sent from the vent hole 12 is lowered, and a cool-felt air starts to be sent. In this case, the timing at which the cool-felt air starts to be sent can be delayed by blocking the flow of the room air flowing into the first air flow passage or into the second air flow passage in the temperature-control OFF operation period, because the heat in the room heater is slowly released.

Then, the room heater according to the present embodiment judges whether the temperature of the combustion housing 2 (temperature detected by a temperature sensor (not shown) which is installed in upper wall 2d of combustion housing 2, for instance) is lower than a predetermined temperature YT2 or not (STEP 101), in the temperature-control OFF operation period; when the temperature of the combustion housing 2 is YT2 or higher, opens the first damper 20 and also closes the second damper 21 (STEP 102); and when the temperature of the combustion housing 2 is lower than YT2, closes the first damper 20 and also opens the second damper 21 (STEP 103).

According to the room heater, when the temperature of the combustion housing 2 is YT2 or higher, the room air is passed only into the first air flow passage, heat is released from the main heat exchanger 6, and also from the combustion housing 2 facing the first air flow passage. When the temperature of the combustion housing 2 is lowered by this heat dissipation and has reached a temperature lower than YT2, the room air is passed only into the second air flow passage, and heat is released from the supplementary heat exchanger 6'. Therefore, the timing at which a cool-felt air starts to be sent can be delayed as much as possible.

In the above, the embodiment of the present invention is described with reference to the drawings, but the present invention is not limited thereto. For instance, in the above described embodiment, the first damper 20 and the second damper 21 are provided, but any one of both of the dampers 20 and 21 can be omitted as well. In addition, in the above described embodiment, the combustion fan 7 is provided on the way of the exhaust path, but the combustion fan can be provided on the way of the air supply path as well.

Furthermore, in the above described embodiment, the vent hole 12 is opened in the upper part of the front panel 1e of the outer case 1, and the warm air fan 13 is arranged in the lower part of the combustion housing 2. However, the vent hole 12 may be opened in the lower part of the front panel 1e, and the warm air fan 13 may be arranged in the upper part of the combustion housing 2. In this case, the supplementary heat exchanger 6' may be arranged in the second extension case 1g, and the drain dish 18 may be arranged in the lower part of the combustion housing 2. In addition, in the above described embodiment, the present invention is applied to a fireplace type of a forced draft direct vent type room heater, of which the inside of the combustion housing 2 can be viewed from the front of the front panel 1e, but can be also applied to a forced draft direct vent type room heater of which the inside of the combustion housing cannot be viewed.

What is claimed is:

1. A forced draft direct vent type room heater comprising:
    an outer case,
    a combustion housing which is provided in the outer case and houses a burner therein,
    a combustion fan for forced draft direct ventilation, which is provided on the way of any one of an air supply path that supplies air for combustion to the combustion housing and an exhaust path that exhausts a combusted gas from the combustion housing,
    a main heat exchanger and a supplementary heat exchanger, which are provided in the outer case and are provided on the way of the exhaust path,
    an air intake and a vent hole which are opened in the outer case,
    a warm air fan in the outer case for taking in room air from the air intake and sending the air to the inside of the room from the vent hole through a section in which the main heat exchanger and the supplementary heat exchanger are arranged,
    a drain dish which is provided in the outer case and which makes a drain formed in an exhaust extension tube that is connected to a downstream end of the exhaust path flow into the drain dish itself, and
    a controller, wherein
    a first air flow passage that leads to the vent hole in the outer case through a section in which the main heat exchanger is arranged and a second air flow passage that does not pass through the section in which the main heat exchanger is arranged but is led to the vent hole through a section in which the supplementary heat exchanger is arranged are separately formed in the outer case,
    at least one of a first damper which can freely block the flow of the room air flowing into the first air flow passage due to the warm air fan and a second damper which can freely block the flow of the room air flowing into the second air flow passage due to the warm air fan is provided,
    and the controller is configured to detect a weak combustion period and to control the at least one of the first damper and the second damper to block the room air from flowing into the first air flow passage or the second air flow passage when the weak combustion period is detected, the weak combustion period being a period wherein a combustion amount of the burner is a predetermined amount or less.

2. The forced draft direct vent type room heater according to claim 1, wherein the controller is configured to:
    detect when a room temperature exceeds a predetermined upper limit temperature which is set higher than a set heating temperature,
    conduct a temperature-control OFF operation wherein the controller controls the warm air fan to rotate at a low speed in a state that the burner stops combustion, and
    control the at least one of the first damper and the second damper to block the room air from flowing into the first air flow passage or the second air flow passage.

3. The forced draft direct vent type room heater according to claim 2, wherein
    both of the first damper and the second damper are provided therein,
    the first air flow passage is formed along the outer surface of the combustion housing, and
    the controller is configured to:
    detect when the temperature of the combustion housing is a predetermined temperature or higher in the temperature-control OFF operation period, and control the first damper to allow the room air to pass into the first air flow passage and the second damper to block the room air from flowing into the second air flow passage; and
    detect when the temperature of the combustion housing is lower than the predetermined temperature, and control the second damper to allow the room air to pass into the second air flow passage and the first damper to block the room air from flowing into the first air flow passage.

4. The forced draft direct vent type room heater according to claim 1, wherein
    both of the first damper and the second damper are provided therein, and
    the controller is configured to:
    detect when the combustion amount of the burner decreases to a predetermined lower limit combustion amount, in a temperature-control operation period of varying a combustion amount of the burner according to a deviation of a set heating temperature from the room temperature,
    when the deviation is a predetermined value or more, control the first damper to allow the room air to pass into the first air flow passage and the second damper to block the room air from flowing into the second air flow passage, and
    when the deviation is less than the predetermined value, control the second damper to allow the room air to pass into the second air flow passage and the first damper to block the room air flowing into the first air flow passage.

5. The forced draft direct vent type room heater according to claim 4, wherein the controller is configured to:
    detect when a room temperature exceeds a predetermined upper limit temperature which is set higher than the set heating temperature, and conduct a temperature-control OFF operation wherein the controller controls the warm air fan to rotate at a low speed in a state in which the burner stops combustion, and controls
    one of the first damper and the second damper to block the room air from flowing into the first air flow passage or the second air flow passage.

6. The forced draft direct vent type room heater according to claim 5, wherein
    the first air flow passage is formed along the outer surface of the combustion housing, and
    the controller is configured to:
    detect when the temperature of the combustion housing is a predetermined temperature or higher in the temperature-control OFF operation period, and control the first damper to allow the room air to pass into the first air flow passage and the second damper to block the room air from flowing into the second air flow passage, and
detect when the temperature of the combustion housing is lower than the predetermined temperature, and control the second damper to allow the room air to pass into the second air flow passage and the first damper to block the room air from flowing into the first air flow passage.

\* \* \* \* \*